US011982522B2

(12) United States Patent
Tabata

(10) Patent No.: US 11,982,522 B2
(45) Date of Patent: May 14, 2024

(54) THREE-DIMENSIONAL MEASURING DEVICE

(71) Applicant: YAMAHA HATSUDOKI KABUSHIKI KAISHA, Iwata (JP)

(72) Inventor: Nobuaki Tabata, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 629 days.

(21) Appl. No.: 17/278,544

(22) PCT Filed: Sep. 27, 2018

(86) PCT No.: PCT/JP2018/036029
§ 371 (c)(1),
(2) Date: Mar. 22, 2021

(87) PCT Pub. No.: WO2020/065850
PCT Pub. Date: Apr. 2, 2020

(65) Prior Publication Data
US 2021/0348918 A1 Nov. 11, 2021

(51) Int. Cl.
G01B 11/25 (2006.01)
(52) U.S. Cl.
CPC ...... *G01B 11/2522* (2013.01); *G01B 11/2527* (2013.01)
(58) Field of Classification Search
CPC . G01B 11/25; G01B 11/2522; G01B 11/2527; G01B 11/245; G01B 11/24; G06T 7/00
See application file for complete search history.

(56) References Cited

U.S. PATENT DOCUMENTS

| 7,525,669 | B1 | 4/2009 | Abdollahi | |
| 2012/0194647 | A1* | 8/2012 | Tomaru | G06T 7/55 348/46 |
| 2014/0160243 | A1* | 6/2014 | Tsuyuki | H04N 23/73 348/46 |

(Continued)

FOREIGN PATENT DOCUMENTS

| CN | 104236481 A | 12/2014 |
| CN | 107091617 A | 8/2017 |

(Continued)

OTHER PUBLICATIONS

An Office Action; "Notice of Reasons for Refusal", mailed by the Japanese Patent Office on Jan. 18, 2022, which corresponds to Japanese Patent Application No. 2020-547739 and is related to U.S. Appl. No. 17/278,544; with English language translation.

(Continued)

*Primary Examiner* — Abdullahi Nur
(74) *Attorney, Agent, or Firm* — Studebaker & Brackett PC

(57) ABSTRACT

An appearance inspection device (three-dimensional measuring device) includes a first measurement unit configured to measure three-dimensional information by a phase shift method, a second measurement unit configured to measure three-dimensional information by an optical cutting method, and a control device configured or programmed to acquire three-dimensional information on a measurement target based on measurement results of both the first measurement unit and the second measurement unit.

20 Claims, 13 Drawing Sheets

(56) References Cited

U.S. PATENT DOCUMENTS

| | | |
|---|---|---|
| 2014/0168662 A1 | 6/2014 | Takabayashi et al. |
| 2015/0109423 A1 | 4/2015 | Shimodaira |
| 2017/0241767 A1 | 8/2017 | Miyata |
| 2017/0249727 A1* | 8/2017 | Mayumi ............... H04N 13/204 |
| 2018/0250821 A1* | 9/2018 | Shimodaira ............ B25J 9/1697 |

FOREIGN PATENT DOCUMENTS

| | | |
|---|---|---|
| CN | 107429991 A | 12/2017 |
| JP | H01-173804 A | 7/1989 |
| JP | 2930746 B2 | 8/1999 |
| JP | 2000-193432 A | 7/2000 |
| JP | 2004-144612 A | 5/2004 |
| JP | 2009-097941 A | 5/2009 |
| JP | 2012-053015 A | 3/2012 |
| JP | 2012-141206 A | 7/2012 |
| JP | 2013-064644 A | 4/2013 |
| JP | 2014-055811 A | 3/2014 |
| JP | 5633058 B1 | 12/2014 |
| JP | 2015-045587 A | 3/2015 |
| JP | 2016-038315 A | 3/2016 |
| JP | 2016-180645 A | 10/2016 |
| JP | 2017-142188 A | 8/2017 |
| JP | 2017-146298 A | 8/2017 |
| JP | 2018-146521 A | 9/2018 |

OTHER PUBLICATIONS

An Office Action mailed by the China National Intellectual Property Administration on Jan. 31, 2023, which corresponds to Chinese Patent Application No. 201880096979.3 and is related to U.S. Appl. No. 17/278,544.

A Submission of an Opinion mailed by the Korean Intellectual Property Office on Sep. 7, 2022, which corresponds to Korean Patent Application No. 10-2021-7000301 and is related to U.S. Appl. No. 17/278,544; with English language translation.

International Search Report issued in PCT/JP2018/036029; mailed Nov. 27, 2018.

Written Opinion issued in PCT/JP2018/036029; mailed Nov. 27, 2018.

An Office Action mailed by the China National Intellectual Property Administration on May 27, 2022, which corresponds to Chinese Patent Application No. 201880096979.3 and is related to U.S. Appl. No. 17/278,544.

* cited by examiner

THREE-DIMENSIONAL MEASURING DEVICE

CROSS-REFERENCE TO RELATED APPLICATION

This application is a National Stage of International Patent Application No. PCT/JP2018/036029, filed Sep. 27, 2018, the entire content of which is incorporated herein by reference

TECHNICAL FIELD

The present disclosure relates to a three-dimensional measuring device.

BACKGROUND ART

Conventionally, a three-dimensional measuring device is known. Such a three-dimensional measuring device is disclosed in Japanese Patent Laid-Open No. 2000-193432, for example.

Japanese Patent Laid-Open No. 2000-193432 discloses a three-dimensional measuring device including a measurement unit that measures a three-dimensional shape by an optical cutting method in which line-shaped laser light is projected in an oblique direction with respect to a reference plane to perform imaging.

SUMMARY

In the three-dimensional measuring device disclosed in Japanese Patent Laid-Open No. 2000-193432, the line-shaped laser light is projected in the oblique direction with respect to the reference plane, and thus a shadowed area is generated due to the three-dimensional shape of the measurement target onto which the laser light is projected. Therefore, there is a problem that it is difficult to accurately measure the three-dimensional shape of the measurement target due to the influence of a shadow.

Accordingly, the present disclosure provides a three-dimensional measuring device capable of accurately measuring three-dimensional information of a measurement target.

A three-dimensional measuring device according to an aspect of the present disclosure a first measurement unit configured to measure three-dimensional information by a phase shift method, a second measurement unit configured to measure three-dimensional information by an optical cutting method, and a controller configured or programmed to acquire three-dimensional information on a measurement target based on measurement results of both the first measurement unit and the second measurement unit. In the phase shift method, an equally spaced grid-shaped light-dark pattern (striped pattern light) having a sinusoidal light intensity distribution is projected onto the measurement target, a plurality of images in which the positions (phases) of the light-dark patterns are shifted are captured, and the three-dimensional shape (height) of the measurement target is calculated based on a difference between pixel values of the same portions in the plurality of captured images. In the optical cutting method, line-shaped light is projected onto the measurement target, an image is captured, and the three-dimensional shape (height) of the measurement target is calculated based on deformation (parallax) of the line in the image.

The three-dimensional measuring device according to this aspect of the present disclosure is configured as described above such that the measurement target is measured by both the optical cutting method and the phase shift method, and thus the height information can be complemented by the measurement by the phase shift method even at a position at which light irradiation by the optical cutting method causes a shadow. Furthermore, the three-dimensional information can be acquired by a plurality of methods including the optical cutting method and the phase shift method, and thus the acquisition accuracy of the three-dimensional information can be improved. Consequently, the three-dimensional information on the measurement target can be accurately measured.

In the aforementioned three-dimensional measuring device according to this aspect, the first measurement unit preferably includes a first imager and a first projector configured to project a first measurement pattern imaged by the first imager. One of the first imager and the first projector preferably has an optical axis arranged in a direction perpendicular to a reference plane, and the other of the first imager and the first projector preferably has an optical axis arranged in a direction inclined with respect to an optical axis direction of the one of the first imager and the first projector. Also, the first measurement unit can include a plurality of first imagers or a plurality of first projectors. The second measurement unit preferably includes a second imager having an optical axis arranged in a direction inclined with respect to a vertical direction of the reference plane. The second imager includes a telecentric optical system, and a second projector arranged at a position in a direction in which the optical axis of the second imager is specularly reflected by the reference plane. The second projector is configured to project a line-shaped second measurement pattern imaged by the second imager. Accordingly, even when the measurement target has a reflective surface such as a mirror surface or a glass surface, the second measurement pattern projected from the second projector can be reliably imaged by the second imager arranged at the position in the specular reflection direction. Furthermore, the second imager includes the telecentric optical system, and thus the second measurement pattern reflected by the reflective surface of the measurement target can be imaged in parallel by the optical system without being deformed. Thus, the three-dimensional information can be accurately measured even for the measurement target having a reflective surface. Moreover, the plurality of first projectors or the plurality of first imagers are provided in the first measurement unit such that the first measurement pattern can be projected or imaged in a plurality of directions. Consequently, even when projection in one direction causes a shadow at a certain position, projection in another direction is performed such that a shadow can be significantly reduced or prevented. Thus, the three-dimensional information at a certain position can be reliably measured.

In the aforementioned three-dimensional measuring device according to this aspect, the controller is preferably configured or programmed to acquire height information indicating a height of the measurement target at each position and reliability information indicating reliability of the height information at the each position based on measurement of the first measurement unit, to acquire the height information and the reliability information based on measurement of the second measurement unit, and to acquire one piece of the height information based on the height information and the reliability information based on the measurement of the first measurement unit, and the height information and the reliability information based on the measurement of the second measurement unit. Accordingly, even when the height information based on the measurement of the first measurement unit and the height information based on the measurement of the second measurement unit are significantly different from each other, one piece of the height information with higher reliability can be acquired based on each reliability information.

In this case, the first measurement unit is preferably configured to project a first measurement pattern in a plurality of directions to measure the three-dimensional information. Also, the controller is preferably configured or programmed to acquire a plurality of pieces of the height information and a plurality of pieces of the reliability information based on the measurement of the first measurement unit, and to acquire one piece of the height information based on the plurality of pieces of the height information and the plurality of pieces of the reliability information based on the measurement of the first measurement unit, and the height information and the reliability information based on the measurement of the second measurement unit. Accordingly, the plurality of pieces of height information is acquired by the first measurement unit using the phase shift method, and thus one piece of the height information with higher reliability can be acquired.

In the aforementioned configuration in which the first measurement unit projects the first measurement pattern in the plurality of directions to measure the three-dimensional information, the controller is preferably configured or programmed to complement the height information with low reliability of the reliability information measured by the second measurement unit with the height information measured by the first measurement unit. Accordingly, in measurement by the second measurement unit using the optical cutting method, the height information can be complemented by measurement by the first measurement unit using the phase shift method even when the reliability is lowered due to the influence of a shadow, for example.

In this case, the controller is preferably configured or programmed to exclude the measurement result in a direction in which a shadow is caused and to complement the height information when projection in a direction in which the first measurement pattern of the first measurement unit is projected is presumed to cause the shadow due to the measurement target. Accordingly, the measurement result in the projection direction in which the accuracy is lowered due to the influence of a shadow among the plurality of projection directions of the first measurement pattern by the phase shift method can be excluded. Thus, the height information based on measurement of the second measurement unit using the optical cutting method can be more accurately complemented with the plurality of pieces of height information measured by the first measurement unit using the phase shift method.

In the aforementioned configuration in which the controller acquires one piece of the height information based on the height information and the reliability information based on the measurement of the first measurement unit, and the height information and the reliability information based on the measurement of the second measurement unit, the controller is preferably configured or programmed to acquire the reliability information at the each position based on a luminance difference due to a plurality of measurements of the first measurement unit. Accordingly, the reliability information can be easily acquired based on the luminance difference due to the plurality of measurements by the first measurement unit using the phase shift method.

In the aforementioned configuration in which the controller acquires one piece of the height information based on the height information and the reliability information based on the measurement of the first measurement unit, and the height information and the reliability information based on the measurement of the second measurement unit, the controller is preferably configured or programmed to acquire the reliability information at the each position based on a luminance value based on the measurement of the second measurement unit. Accordingly, the reliability information can be easily acquired based on the luminance value based on the measurement of the second measurement unit using the optical cutting method.

In the aforementioned three-dimensional measuring device according to this aspect, the controller is preferably configured or programmed to determine whether a protrusion shape based on the measurement result of the first measurement unit is noise or a structure based on the measurement result of the second measurement unit. Accordingly, it is possible to determine, by the optical cutting method of the second measurement unit, that a virtual image appearing in the protrusion shape by imaging by the phase shift method of the first measurement unit is noise, and thus the noise is removed such that the height information can be more accurately acquired.

In the aforementioned three-dimensional measuring device according to this aspect, the controller is preferably configured or programmed to perform measurement by the second measurement unit before measurement by the first measurement unit, and to perform a control to adjust a height position measured by the first measurement unit based on the measurement result of the second measurement unit. Accordingly, based on the three-dimensional information measured by the second measurement unit using the optical cutting method, the height position measured by the first measurement unit using the phase shift method can be adjusted along the three-dimensional shape of the measurement target, and thus it is possible to easily focus the image.

In the aforementioned three-dimensional measuring device according to this aspect, the controller is preferably configured or programmed to perform measurement by the second measurement unit before measurement by the first measurement unit, to acquire plane position information on the measurement target based on the measurement result of the second measurement unit, and to perform a control to adjust a plane position measured by the first measurement unit. Accordingly, the operation of the first measurement unit using the phase shift method to acquire the plane position information can be omitted, and thus an increase in the time required for the measurement operation can be significantly reduced or prevented as compared with a case in which the plane position information is acquired again by the first measurement unit.

In the aforementioned three-dimensional measuring device according to this aspect, the measurement target preferably includes a board on which an electronic component is mounted. Accordingly, the three-dimensional information on the board on which the electronic component is mounted can be accurately measured.

According to the present disclosure, as described above, it is possible to accurately measure the three-dimensional information of the measurement target.

DETAILED DESCRIPTION

An embodiment of the present disclosure is hereinafter described on the basis of the drawings.

The configuration of an appearance inspection device 100 according to the embodiment of the present disclosure is described with reference to FIGS. 1 to 15. The appearance inspection device 100 is an example of a "three-dimensional measuring device" in the claims.

Figure 1:
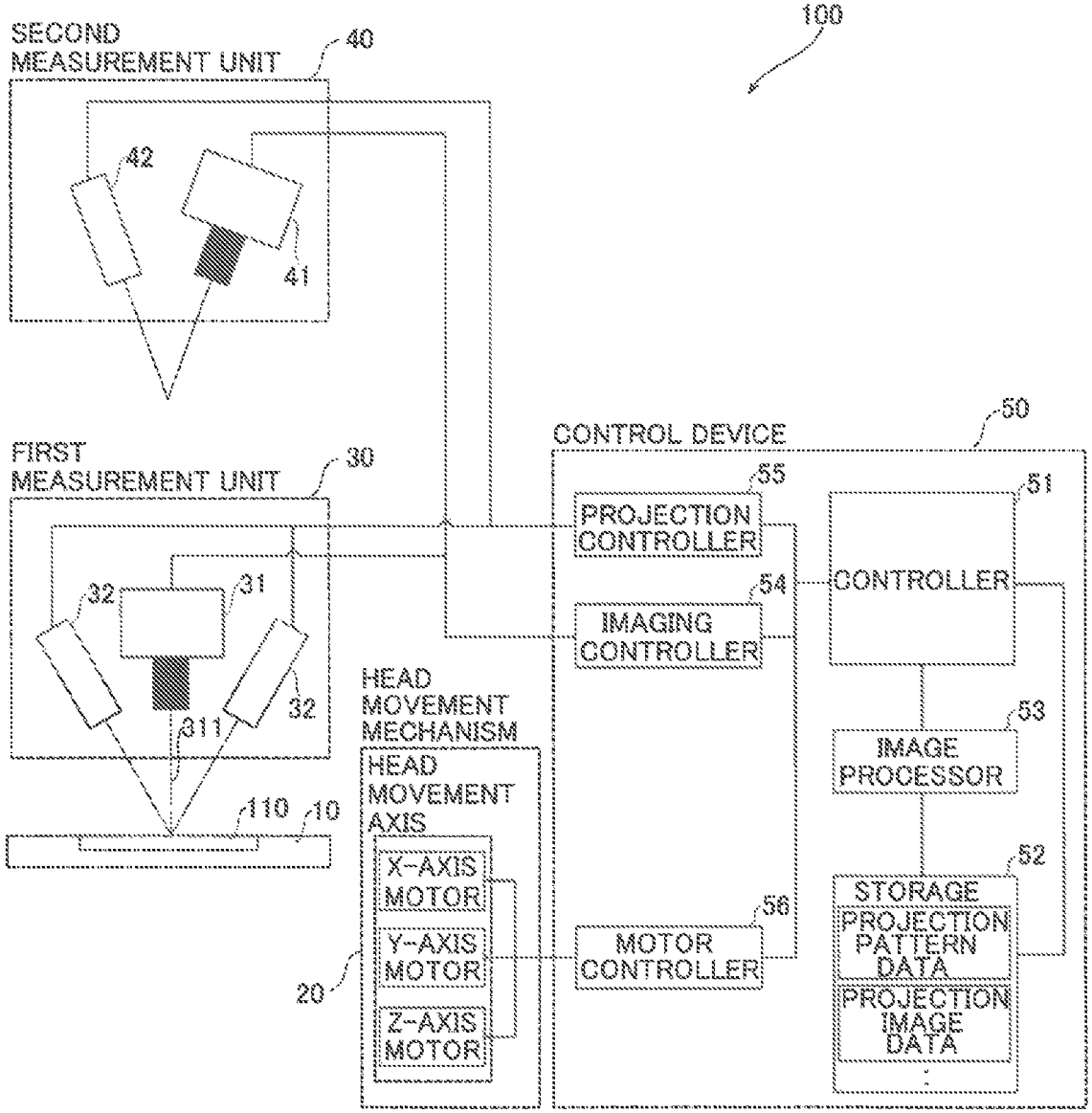
FIG. 1 is a block diagram showing an appearance inspection device according to an embodiment of the present disclosure.

As shown in FIG. 1, the appearance inspection device 100 according to this embodiment images a printed board (hereinafter referred to as a "board") 110 as an inspection target during or after manufacturing in a board manufacturing process, and performs various inspections on the board 110 and electronic components 111 (see FIG. 2) on the board 110. The appearance inspection device 100 is a portion of a board manufacturing line for manufacturing a circuit board by mounting the electronic components 111 on the board 110. The board 110 is an example of a "measurement target" in the claims.

As an outline of the board manufacturing process, first, solder (solder paste) is printed (applied) on the board 110, on which a wiring pattern is formed, in a predetermined pattern by a solder printing device (not shown) (solder printing step). Then, the electronic components 111 are mounted on the board 110 by a surface mounter (not shown) after the solder printing (mounting step) such that terminals of the electronic components 111 are arranged on the solder. After that, the board 110 on which the electronic components 111 have been mounted is conveyed to a reflow furnace (not shown) to melt and harden (cool) the solder (reflow step) such that the terminals of the electronic components 111 are soldered to wiring of the board 110. Thus, the electronic components 111 are fixed on the board 110 in a state in which the electronic components 111 are electrically connected to the wiring, and the board manufacturing is completed.

The appearance inspection device 100 is used to inspect the printed state of the solder on the board 110 after the solder printing step, inspect the mounted states of the electronic components 111 after the mounting step, or inspect the mounted states of the electronic components 111 after the reflow step, for example. Therefore, one or more appearance inspection devices 100 are provided in the board manufacturing line. As the printed state of the solder, printing misalignment with respect to a design printing position, the shape, volume, and height (application amount) of the solder, the presence or absence of a bridge (short circuit), etc. are inspected. As the mounted states of the electronic components 111, whether or not the types and orientations (polarities) of the electronic components 111 are appropriate, whether or not the amount of misalignment with respect to design mounting positions of the electronic components 111 is within an allowable range, whether or not the solder joint states of the terminals are normal, etc. are inspected. As common inspection contents between the steps, foreign matter such as dust and other deposits is also detected.

As shown in FIG. 1, the appearance inspection device 100 includes a board transport conveyor 10 for conveying the board 110, a head movement mechanism 20 capable of moving above the board transport conveyor 10 in X and Y directions (horizontal direction) and a Z direction (upward-downward direction), a first measurement unit 30 and a second measurement unit 40 held by the head movement mechanism 20, and a control device 50 configured or programmed to control the appearance inspection device 100. The control device 50 is an example of a "controller" in the claims.

The board transport conveyor 10 is configured to convey the board 110 in the horizontal direction, and to stop and hold the board 110 at a predetermined inspection position. Furthermore, the board transport conveyor 10 is configured to convey the board 110 that has been inspected in the horizontal direction from the predetermined inspection position and carry the board 110 out of the appearance inspection device 100.

The head movement mechanism 20 is provided above the board transport conveyor 10, and includes an orthogonal three-axis (XYZ-axis) robot using ball screw axes and servomotors, for example. The head movement mechanism 20 includes an X-axis motor, a Y-axis motor, and a Z-axis motor for X-axis, Y-axis, and Z-axis driving. The head movement mechanism 20 is configured to move the first measurement unit 30 and the second measurement unit 40 in the X and Y directions (horizontal direction) and the Z direction (upward-downward direction) above the board transport conveyor 10 (board 110) with these X-axis motor, Y-axis motor, and Z-axis motor.

The first measurement unit 30 is configured to measure three-dimensional information by a phase shift method. The first measurement unit 30 includes a first imager 31 and first projectors 32. The first measurement unit 30 is configured to be moved to a predetermined position above the board 110 by the head movement mechanism 20, and to perform imaging to inspect the appearance of the board 110 and the electronic components 111 on the board 110, for example, using the first imager 31, the first projectors 32, etc.

The first imager 31 is configured to image the board 110 irradiated with striped pattern light by the first projectors 32. The first imager 31 includes an imaging device such as a CCD image sensor or a CMOS image sensor. The first imager 31 is configured to image the board 110 in a substantially rectangular imaging area. Furthermore, in the first imager 31, the optical axis 311 thereof is arranged in a direction perpendicular to a reference plane in the horizontal direction. That is, the first imager 31 is configured to capture a two-dimensional image of the upper surface of the board 110 from a position substantially vertically above the upper surface of the board 110. With this first imager 31, a two-dimensional image can be obtained under illumination light of the first projectors 32.

Figure 3:
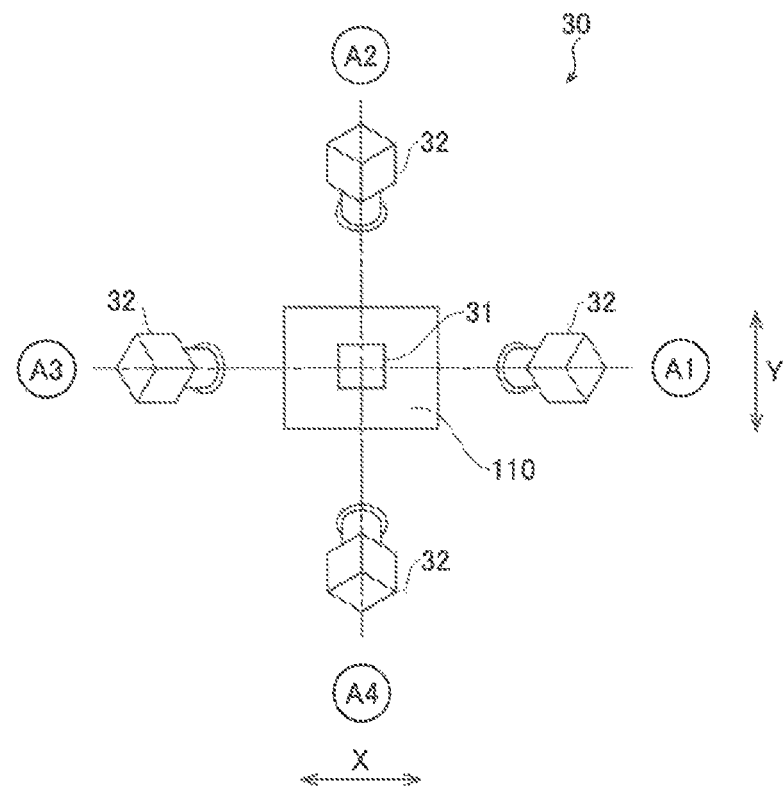
FIG. 3 is a diagram showing a first measurement unit of the appearance inspection device according to the embodiment of the present disclosure.

A plurality of first projectors 32 are provided. Each of the plurality of first projectors 32 is configured to project a first measurement pattern imaged by the first imager 31 in a direction inclined with respect to the optical axis 311 direction of the first imager 31. That is, the first measurement unit 30 is configured to project the first measurement pattern in a plurality of directions to measure three-dimensional information. As shown in FIG. 3, the plurality of (four) first projectors 32 are arranged so as to surround the first imager 31 as viewed from above. Furthermore, the four first projectors 32 are arranged at positions equidistant from an imaging center (first imager 31) at substantially equiangular intervals (about 90 degrees). The four first projectors 32 are configured to project the first measurement pattern in an A1 direction, an A2 direction, an A3 direction, and an A4 direction, respectively. As shown in FIG. 1, each of the first projectors 32 is configured to project the first measurement pattern in an oblique direction with respect to the optical axis 311 of the first imager 31. Furthermore, the first projectors 32 are configured to project an equally spaced grid-shaped light-dark pattern (striped pattern light) having a sinusoidal light intensity distribution as the first measurement pattern. The first projectors 32 are configured to shift the position (phase) of the light-dark pattern and project it.

The second measurement unit 40 is configured to measure three-dimensional information by an optical cutting method. The second measurement unit 40 includes a second imager 41 and a second projector 42. The second measurement unit 40 is configured to be moved to a predetermined position above the board 110 by the head movement mechanism 20, and to perform imaging to inspect the appearance of the board 110 and the electronic components 111 on the board 110, for example, using the second imager 41, the second projector 42, etc.

Figure 2:
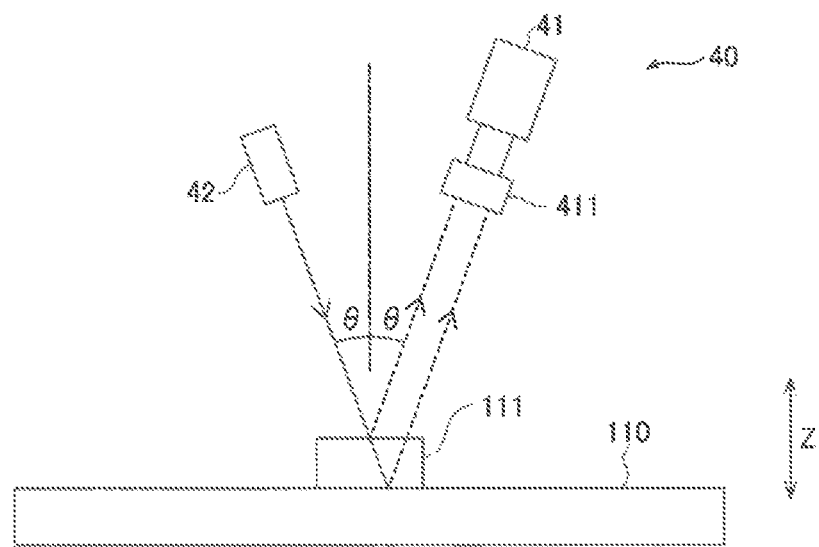
FIG. 2 is a diagram showing a second measurement unit of the appearance inspection device according to the embodiment of the present disclosure.

The second imager 41 is configured to image the board 110 irradiated with line-shaped pattern light by the second projector 42. The second imager 41 includes an imaging device such as a CCD image sensor or a CMOS image sensor. Furthermore, in the second imager 41, the optical axis thereof is arranged in a direction inclined from the vertical direction of the reference plane in the horizontal direction. The second imager 41 includes a telecentric optical system 411, as shown in FIG. 2. The telecentric optical system 411 is configured to cause light parallel to the optical axis to enter the second imager 41.

The second projector 42 is arranged at a position in a direction in which the optical axis of the second imager 41 is specularly reflected by the reference plane in the horizontal direction. The second projector 42 is configured to project a line-shaped second measurement pattern imaged by the second imager 41. Furthermore, the second projector 42 is configured to radiate laser light. The second projector 42 is configured to telecentrically (parallel) radiate the laser light on a line. The second projector 42 and the second imager 41 are configured to image the board 110 while scanning (moving) the line-shaped laser light. As shown in FIG. 2, in the second projector 42, the optical axis thereof is arranged obliquely by an angle θ with respect to the vertical direction. In the second imager 41, the optical axis thereof is arranged obliquely by an angle θ on the side opposite to the second projector 42 with respect to the vertical direction. Thus, even when the electronic components 111 include mirror surfaces and the second measurement pattern is substantially totally reflected, the second measurement pattern can be imaged by the second imager 41.

As shown in FIG. 1, the control device 50 is configured or programmed to control each portion of the appearance inspection device 100. The control device 50 includes a controller 51, a storage 52, an imager processor 53, an imaging controller 54, a projection controller 55, and a motor controller 56.

The controller 51 includes a processor such as a central processing unit (CPU) that performs logical operations, a read-only memory (ROM) that stores programs for controlling the CPU, for example, a random access memory (RAM) that temporarily stores various data during the operation of the device, etc. The controller 51 is configured or programmed to control each portion of the appearance inspection device 100 via the imager processor 53, the imaging controller 54, the projection controller 55, and the motor controller 56 according to the programs stored in the ROM or software (programs) stored in the storage 52. The controller 51 controls the first measurement unit 30 and the second measurement unit 40 to perform various appearance inspections on the board 110.

The storage 52 is a non-volatile storage device that stores various data and allows the controller 51 to read the data. In the storage 52, image data captured by the first imager 31 and the second imager 41, board data that defines design position information of the electronic components 111 to be mounted on the board 110, a component shape database that defines the shapes of the electronic components 111 to be mounted on the board 110, information on projection patterns (the first measurement pattern and the second measurement pattern) to be generated by the first projectors 32 and the second projector 42, etc. are stored. The controller 51 inspects the solder on the board 110, inspects the mounted states of the electronic components 111 mounted on the board 110, and inspects the finished board 110, for example, based on three-dimensional (three-dimensional shape) inspection by three-dimensional shape measurement by the first measurement unit 30 and the second measurement unit 40.

The imager processor 53 is configured to process images (imaging signals) captured by the first imager 31 and the second imager 41 to generate image data suitable to recognize (image-recognize) the electronic components 111 and the solder joints (solder) of the board 110.

The imaging controller 54 is configured or programmed to read the imaging signals from the first imager 31 and the second imager 41 at the predetermined timing based on a control signal output from the controller 51, and output the read imaging signals to the imager processor 53. The projection controller 55 is configured or programmed to control projection by the first projector 32 and the second projector 42 based on a control signal output from the controller 51.

The motor controller 56 is configured or programmed to control driving of the servo motors (the X-axis motor, the Y-axis motor, and the Z-axis motor of the head movement mechanism 20, a motor (not shown) for driving the board transport conveyor 10, etc.) of the appearance inspection device 100 based on control signals output from the controller 51. Furthermore, the motor controller 56 is configured or programmed to acquire the positions of the first measurement unit 30, the second measurement unit 40, the board 110, etc. based on signals from encoders (not shown) of the servo motors.

In this embodiment, the control device 50 is configured or programmed to acquire three-dimensional information on the measurement target based on the measurement results of both the first measurement unit 30 and the second measurement unit 40.

Figure 4:
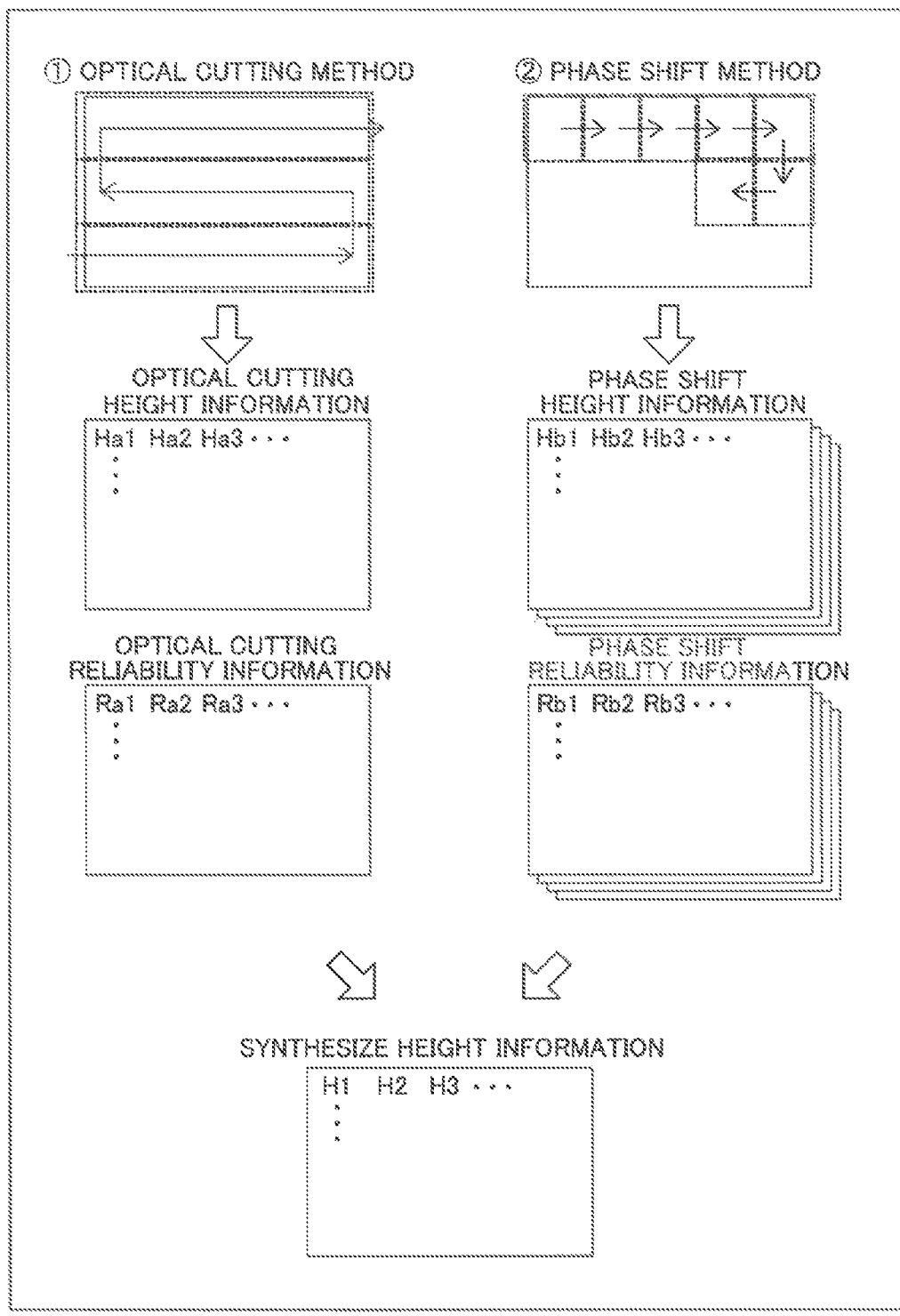
FIG. 4 is a diagram for illustrating acquisition of height information by the appearance inspection device according to the embodiment of the present disclosure.

Specifically, as shown in FIG. 4, the control device 50 acquires height information indicating the height of the measurement target at each position and reliability information indicating the reliability of the height information at each position based on measurement of the first measurement unit 30. Furthermore, the control device 50 acquires height information and reliability information based on measurement of the second measurement unit 40. The control device 50 is configured or programmed to acquire one piece of height information based on the height information and the reliability information based on the measurement of the first measurement unit 30, and the height information and the reliability information based on the measurement of the second measurement unit 40.

First, the control device 50 acquires optical cutting height information by the optical cutting method of the second measurement unit 40. The second measurement unit 40 performs laser scanning with a predetermined scan width and measures three-dimensional information on the entire board 110. The height information includes numerical information regarding the height for each position (corresponding to a pixel). Furthermore, the control device 50 acquires optical cutting reliability information. The reliability information includes information regarding the reliability of the height at that position for each position (corresponding to a pixel). For example, the information regarding the reliability is categorized into three levels: high, medium, and low.

Next, the control device 50 acquires phase shift height information by the phase shift method of the first measurement unit 30. The first measurement unit 30 sequentially images necessary positions on the board 110. In this case, the first measurement unit 30 performs imaging by the first imager 31 while performing projection by the four first projectors 32, and thus four pieces of height information and four pieces of reliability information can be obtained for each position. That is, the control device 50 acquires a plurality of pieces of height information and a plurality of pieces of reliability information based on measurement of the first measurement unit 30.

Then, the control device 50 acquires one piece of height information based on the plurality of pieces of height information and the plurality of pieces of reliability information based on the measurement of the first measurement unit 30, and the height information and the reliability information based on the measurement of the second measurement unit 40.

In the phase shift method by the first measurement unit 30, the equally spaced grid-shaped light-dark pattern (striped pattern light) having the sinusoidal light intensity distribution is projected onto the measurement target, a plurality of images in which the positions (phases) of the light-dark patterns are shifted are captured, and the three-dimensional shape (height) of the measurement target is calculated based on a difference between pixel values of the same portions in the plurality of captured images.

The control device 50 is configured or programmed to acquire the reliability information at each position based on a luminance difference due to a plurality of measurements of the first measurement unit 30 in the phase shift method by the first measurement unit 30. That is, the control device 50 is configured or programmed to acquire the reliability information based on a luminance difference due to a plurality of phase-shifted measurements. Specifically, when imaging is performed four times while the phase is shifted by $\pi/2$, the respective luminance values are defined as d0, d1, d2, and d3. The phase shift angle a is calculated as $\alpha=\mathrm{atan}((d2-d0)/(d3-d1))$. The reliability R is calculated as $R=\sqrt{((d2-d0)^2+(d3-d1)^2)}$.

Figure 5:
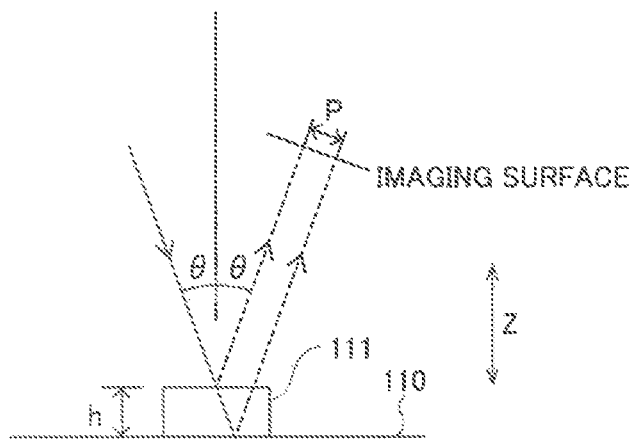
FIG. 5 is a diagram for illustrating height measurement by the second measurement unit of the appearance inspection device according to the embodiment of the present disclosure.

In the optical cutting method by the second measurement unit 40, line-shaped light is projected onto the measurement target, an image is captured, and the three-dimensional shape (height) of the measurement target is calculated based on deformation (parallax) of the line in the image. For example, as shown in FIG. 5, a pattern on the upper surface of the electronic component 111 and a pattern on the upper surface of the board 110 deviate from each other by a parallax P on an imaging surface. Using this parallax P, the height h of the electronic component 111 is calculated as h=P/2sinθ.

Figure 6:
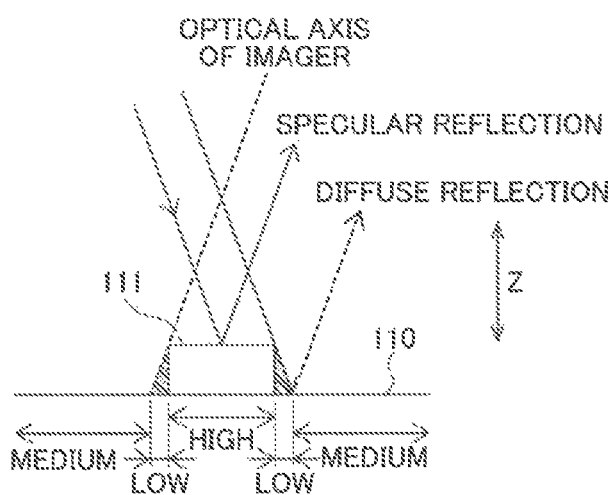
FIG. 6 is a diagram for illustrating the reliability of the height measurement by the second measurement unit of the appearance inspection device according to the embodiment of the present disclosure.
Figure 7:
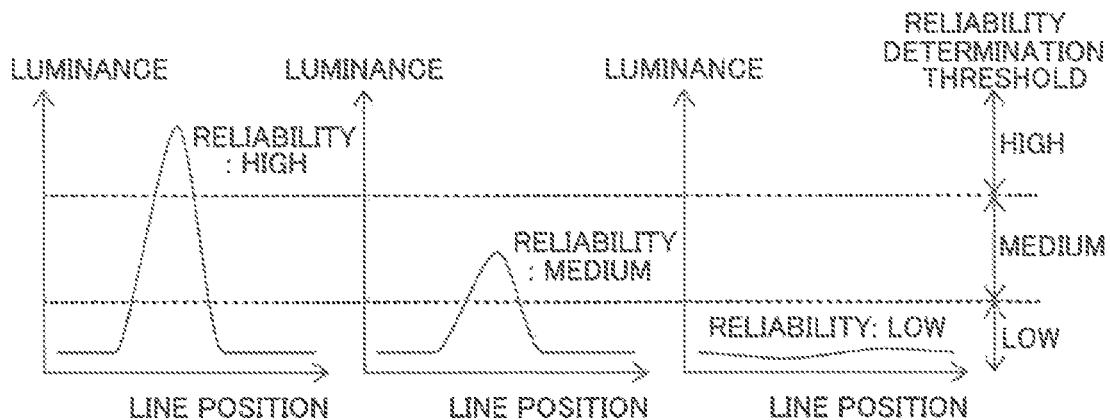
FIG. 7 is a diagram for illustrating determination of the reliability of the height measurement by the second measurement unit of the appearance inspection device according to the embodiment of the present disclosure.

The control device 50 is configured or programmed to acquire the reliability information at each position based on a luminance value based on measurement of the second measurement unit 40 in the optical cutting method by the second measurement unit 40. Specifically, as shown in FIG. 6, when the electronic component 111 having a mirror surface is mounted on the board 110, laser light reflected on the electronic component 111 is specularly reflected and reaches the second imager 41. In this case, as shown in FIG. 7, the peak of the luminance value on the same line becomes high. When the peak of the luminance value is higher than "high" of a reliability determination threshold, the control device 50 sets the reliability of the height information at that position to "high".

As shown in FIG. 6, laser light reflected on the board 110 diffuses and reaches the second imager 41. In this case, as shown in FIG. 7, the peak of the luminance value on the same line becomes medium. When the peak of the luminance value is lower than "high" of the reliability determination threshold and is "medium" or higher, the control device 50 sets the reliability of the height information at that position to "medium". Note that the reliability of the height information at positions of the component other than the mirror surface also becomes "medium".

As shown in FIG. 6, laser light does not reach the second imager 41 in shadow portions of the electronic component 111. In this case, as shown in FIG. 7, the peak of the luminance value on the same line becomes low. When the peak of the luminance value is lower than "medium" of the reliability determination threshold, the control device 50 sets the reliability of the height information at that position to "low". Note that the reliability of the height information in shadows, holes, dents, etc. of the electronic component 111 also becomes "low". The amount of laser light of the second projector 42 is changed to be larger such that the luminance of the reflected light on the surface of the board 110 can be adjusted to a level at which the reliability becomes high. However, in that case, the luminance of the reflected light on the mirror surface becomes too high, and thus the light receiving state of the second imager 41 may be saturated, and accurate measurement may not be possible. Therefore, it is preferable to adjust the amount of laser light to an appropriate level such that the luminance of the reflected light on the mirror surface is sufficient for measurement, the light receiving state of the second imager 41 is not saturated, and the reliability is high. In this case, the luminance of the reflected light decreases on the surface of the board 110 and the non-mirrored upper surface of the component, and the reliability tends to be at a medium level. In some cases, both the reflected light on the mirror surface and the reflected light on the surface of the board 110 or the like may have a luminance at which the reliability becomes high, and the light receiving state of the camera may not be saturated.

Figure 8:
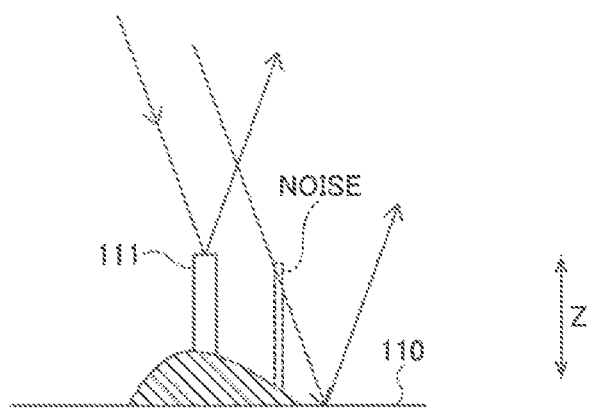
FIG. 8 is a diagram for illustrating removal of noise in the height information of the appearance inspection device according to the embodiment of the present disclosure.

As shown in FIG. 8, the control device 50 is configured or programmed to determine whether a protrusion shape based on the measurement result of the first measurement unit 30 is noise or a structure based on the measurement result of the second measurement unit 40. That is, as shown in FIG. 8, when the protrusion shape observed by the phase shift method is not observed by the optical cutting method, the control device 50 determines that it is noise and removes it. When the protrusion shape is observed by the phase shift method and also by the optical cutting method, the control device 50 determines that the protrusion shape is a structure (electronic component 111) and excludes it from noise removal. For example, noise in the phase shift method is generated when the surroundings are reflected in the curved surface of a solder fillet. Specifically, the solder fillet of the component joint has a semi-mirror curved surface. The surrounding board 110 surface and the component are reflected in the solder fillet portion together with the striped pattern. Therefore, phase fringes of the surrounding environment are observed in the solder fillet portion, and noise is caused.

The noise in the phase shift method is also generated by multiple reflections. For example, fringes reflected on a side surface of the component are projected onto the surrounding board 110 surface or the component (secondary reflection fringes). In this case, in the relevant area, secondary fringes overlap primary fringes, and noise is caused. The generation of noise as described above is considered to be one of the reasons why a plurality of measured values of different heights are measured.

Figure 9:
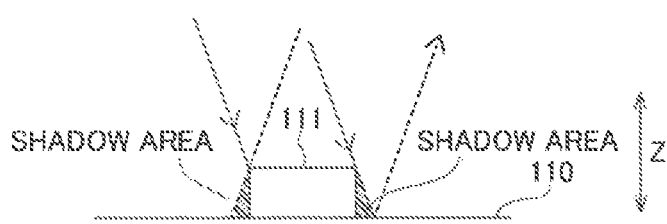
FIG. 9 is a diagram for illustrating shadow areas during measurement of the appearance inspection device according to the embodiment of the present disclosure.
Figure 10:
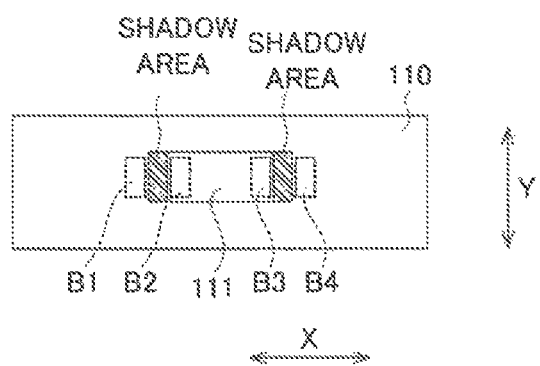
FIG. 10 is a diagram for illustrating determination of the shadow areas during the measurement of the appearance inspection device according to the embodiment of the present disclosure.
Figure 11:
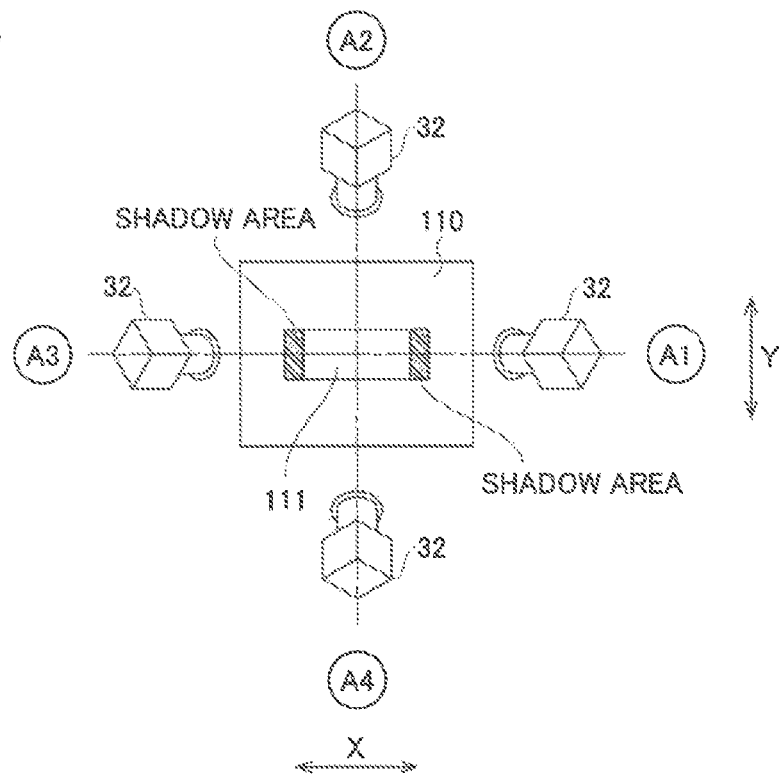
FIG. 11 is a diagram for illustrating exclusion of the measurement results of the shadow areas during the measurement of the appearance inspection device according to the embodiment of the present disclosure.

As shown in FIGS. 9 to 11, the control device 50 is configured or programmed to complement the height information measured by the second measurement unit 40 in which the reliability of the reliability information is low, with the height information measured by the first measurement unit 30. Specifically, the control device 50 complements the height information at a position at which the reliability is low such that the laser light from the second projector 42 becomes a shadow, with the height information measured by the phase shift method of the first measurement unit 30.

The control device 50 compares the heights of areas B1 to B4 around shadow areas with each other, and determines in which direction the projection causes a shadow. When the projection in a direction in which the first measurement pattern of the first measurement unit 30 is projected is presumed to cause a shadow due to the measurement target, the control device 50 excludes the measurement result in the direction in which the shadow is caused and complements the height information.

Specifically, as shown in FIG. 10, when the height of the right area B2 (B4) of the shadow area is higher than that of the left area B1 (B3), the control device 50 determines that projection from the right side causes a shadow. That is, as shown in FIG. 11, the control device 50 determines that projection from the first projector 32 in an A1 direction causes a shadow. In this case, an image captured in this shadow area by the projection from the first projector 32 in the A1 direction is not used for image complementation (integration).

When the height of the left area B1 (B3) of the shadow area is higher than that of the right area B2 (B4), the control device 50 determines that projection from the left side causes a shadow. That is, the control device 50 determines that projection from the first projector 32 in an A3 direction causes a shadow. In this case, an image captured in this shadow area by the projection from the first projector 32 in the A3 direction is not used for image complementation (integration).

When the heights of the left area B1 (B3) and the right area B2 (B4) of the shadow area are the same as each other, the control device 50 determines that the projection from the right side and the projection from the left side cause shadows. That is, the control device 50 determines that the projection from the first projectors 32 in the A1 direction and the A3 direction causes shadows. In this case, the images captured in these shadow areas by the projections from the first projectors 32 in the A1 direction and the A3 direction are not used for image complementation (integration).

The control device 50 is configured or programmed to control measurement by the second measurement unit 40 before measurement by the first measurement unit 30. Furthermore, the control device 50 is configured or programmed to perform a control to adjust a height position measured by the first measurement unit 30 based on the measurement result of the second measurement unit 40. That is, the control device 50 adjusts the height position of the first measurement unit 30 to a position at which imaging by the first measurement unit 30 can be easily focused based on the height position of the board 110 measured by the second measurement unit 40.

The control device 50 is configured or programmed to perform measurement by the second measurement unit 40 before measurement by the first measurement unit 30 and to acquire plane position information on the measurement target based on the measurement result of the second measurement unit 40. Furthermore, the control device 50 is configured or programmed to perform a control to adjust a plane position measured by the first measurement unit 30. Specifically, the control device 50 recognizes fiducial marks of the board 110 based on imaging by the second measurement unit 40. Then, the control device 50 adjusts a horizontal position measured by the first measurement unit 30 based on the recognized fiducial marks.

Figure 12:
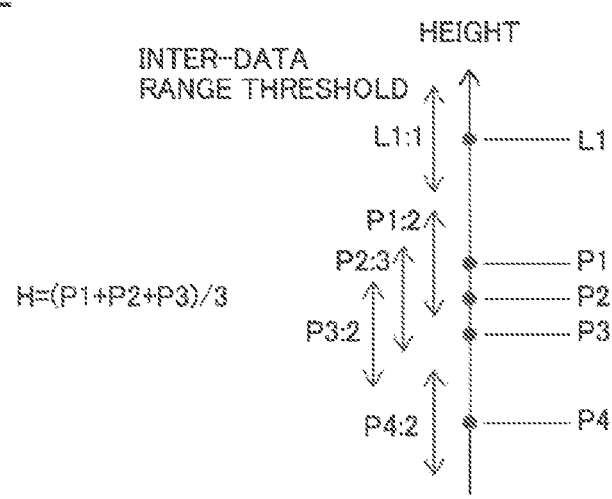
FIG. 12 is a diagram for illustrating grouping of measurement results of the appearance inspection device according to the embodiment of the present disclosure.

The control device 50 is configured or programmed to integrate a plurality of measured values (height information) measured by the first measurement unit 30 and a measured value (height information) measured by the second measurement unit 40 at each position (pixel of interest) to acquire one measured value (height information). For example, as shown in FIG. 12, the control device 50 groups and then integrates measured values (height information) (P1, P2, P3, and P4) measured by the first measurement unit 30 and a measured value (height information) (L1) measured by the second measurement unit 40. In the grouping, with each measured value as a center, measured values within an inter-data range threshold are grouped in the same group. A group of the measured value L1 is a group of only the measured value L1 (one piece of data). A group of the measured value P1 is a group of the measured values P1 and P2 (two pieces of data). A group of the measured value P2 is a group of the measured values P1, P2, and P3 (three pieces of data). A group of the measured value P3 is a group of the measured values P2 and P3 (two pieces of data). A group of the measured value P4 is a group of only the measured value P4 (one piece of data).

Among the groups of the measured values L1 and P1 to P4, the group with a large number of data is the group of the measured value P2. Therefore, the control device 50 takes the average of the measured values of the group with the largest number of data (the group of the measured value P2) as an integrated measured value of the height information. That is, the integrated measured value H is calculated as H=(P1+P2+P3)/3.

Figure 13:
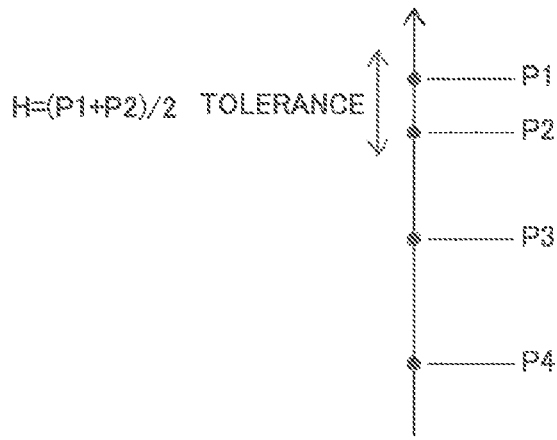
FIG. 13 is a diagram for illustrating integration of measurement results in a case in which the reliability of measurement results by an optical cutting method of the appearance inspection device according to the embodiment of the present disclosure is low.

The control device 50 is configured or programmed to integrate the measured values (height information) at each position (pixel of interest) based on the reliability of the measured value (height information) measured by the second measurement unit 40. For example, as shown in FIG. 13, when the reliability of the measured value L1 measured by the second measurement unit 40 is low, the control device 50 excludes the measured value L1 with low reliability measured by the second measurement unit 40 and then integrates the measured values P1 to P4 with reliability within a valid range measured by the first measurement unit 30. Specifically, the control device 50 takes the average of a plurality of measured values extracted based on a set tolerance among the measured values P1 to P4 as the integrated measured value of the height information. In the case of an example of FIG. 13, a distance between the measured values P1 and P2 is within a tolerance range, and thus the integrated measured value H is calculated as H=(P1+P2)/2.

Figure 14:
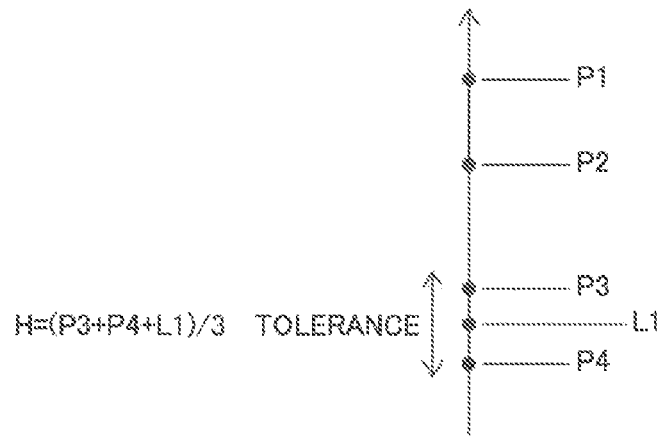
FIG. 14 is a diagram for illustrating integration of measurement results in a case in which the reliability of the measurement results by the optical cutting method of the appearance inspection device according to the embodiment of the present disclosure is medium.

As shown in FIG. 14, when the reliability of the measured value L1 measured by the second measurement unit 40 is medium, the control device 50 takes the average of the measured values within the tolerance with the measured value L1 as a center as the integrated measured value of the height information. This is based on the fact that the measured value measured by the second measurement unit 40 using the optical cutting method is the most reliable. In the case of an example of FIG. 14, the measured values P3 and P4 are within a tolerance range of the measured value L1, and thus the integrated measured value H is calculated as H=(P3+P4+L1)/3.

Figure 15:
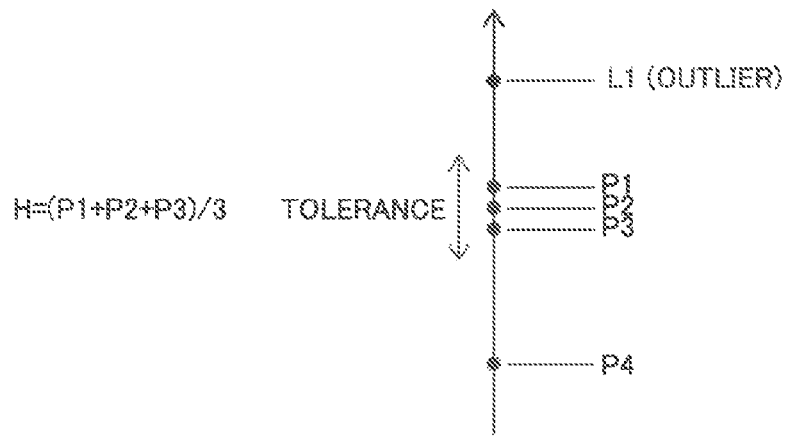
FIG. 15 is a diagram for illustrating integration of measurement results in a case in which there is an outlier in the measurement results of the appearance inspection device according to the embodiment of the present disclosure.

As shown in FIG. 15, even when the reliability of the measured value L1 measured by the second measurement unit 40 is medium to high, the control device 50 excludes the measured value L1 and then integrates the measured values, taking into consideration the aggregate state of the measured values P1 to P4 measured by the first measurement unit 30. In the case of an example of FIG. 15, the measured values P1 to P3, which are the majority of the measured values P1 to P4, aggregate within the tolerance range. Thus, the measured value L1, of which a distance from the measured values P1 to P3 is equal to or greater than the tolerance, is regarded as an outlier. Similarly, the measured value P4, of which a distance from the measured values P1 to P3 is equal to or greater than the tolerance, is regarded as an outlier. The integrated measured value H is calculated as H=(P1+P2+P3)/3.

(Description of Three-Dimensional Information Acquisition Process)

A three-dimensional information acquisition process by the control device 50 is now described with reference to FIG. 16.

Figure 16:
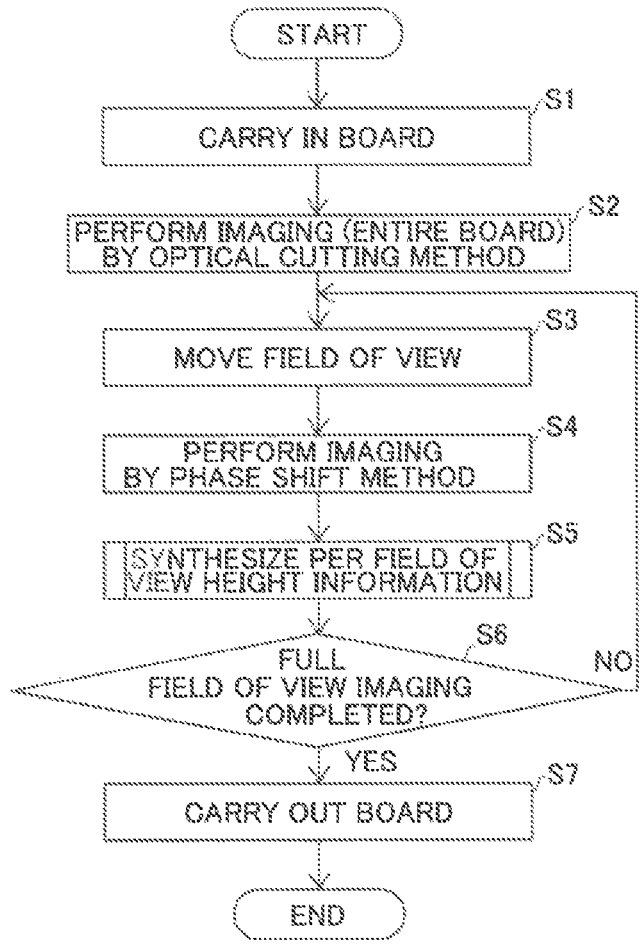
FIG. 16 is a flowchart for illustrating a three-dimensional information acquisition process by a control device of the appearance inspection device according to the embodiment of the present disclosure.

In step Si of FIG. 16, the board 110 is carried in by the board transport conveyor 10. In step S2, the second measurement unit 40 performs imaging by the optical cutting method. In this case, scanning (imaging) of the entire board 110 is performed.

In step S3, the field of view for imaging by the first measurement unit 30 is moved. In step S4, the first measurement unit 30 performs imaging by the phase shift method in the moved field of view.

In step S5, height information on the imaged field of view is synthesized. In step S6, it is determined whether or not imaging of the full field of view by the first measurement unit 30 has been completed. When the imaging of the full field of view has not been completed, the process returns to step S3. When the imaging of the full field of view has been completed, the process advances to step S7.

In step S7, the board 110 is carried out by the board transport conveyor 10. Then, the three-dimensional information acquisition process is terminated.

(Description of Per Field of View Height Information Synthesis Process (First Example))

A per field of view height information synthesis process (first example) in step S5 of FIG. 16 by the control device 50 is now described with reference to FIG. 17.

Figure 17:
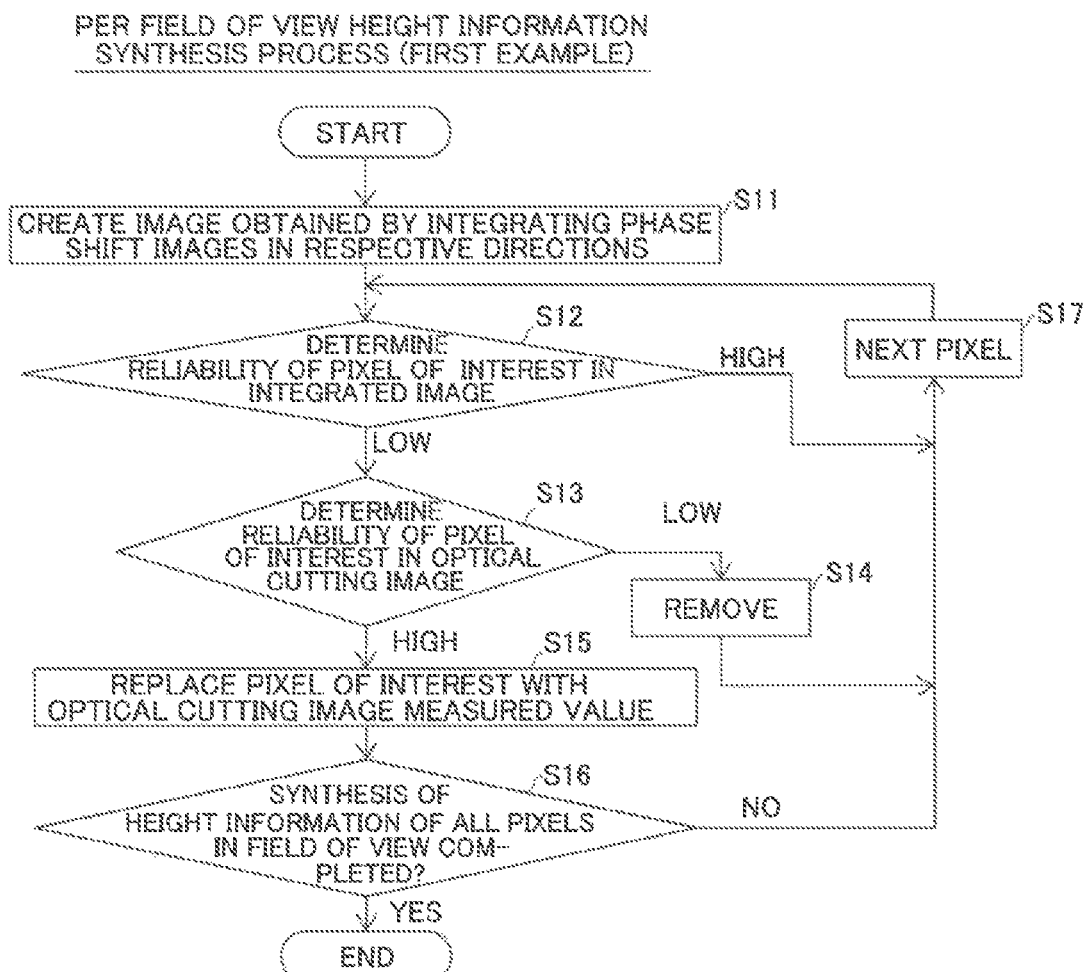
FIG. 17 is a flowchart for illustrating a first example of a per field of view height information synthesis process by the control device of the appearance inspection device according to the embodiment of the present disclosure.

In step S11 of FIG. 17, an image (height information) obtained by integrating phase shift images in respective directions is created. Specifically, height information in which the phase shift images captured in four directions have been integrated is created.

In step S12, the reliability of a pixel of interest in the integrated image by the phase shift method is determined. When the reliability of the pixel of interest is low, the process advances to step S13, and when the reliability of the pixel of interest is high, the process advances to step S17.

In step S13, the reliability of the pixel of interest in the image by the optical cutting method is determined. When the reliability of the pixel of interest is low, the process advances to step S14, and when the reliability of the pixel of interest is high, the process advances to step S15. In step S14, the height information on the pixel of interest is removed (no value).

In step S15, the height information on the pixel of interest is replaced with the measured value of the image of the optical cutting method. In step S16, it is determined whether or not synthesis (integration) of height information on all pixels in the field of view has been completed. When it has been completed, the per field of view height information synthesis process is terminated. When it has not been completed, the process advances to step S17.

In step S17, the height information synthesis process switches to the next pixel. Then, the process returns to step S12.

(Description of Per Field of View Height Information Synthesis Process (Second Example))

The per field of view height information synthesis process (second example) in step S5 of FIG. 16 by the control device 50 is now described with reference to FIG. 18.

Figure 18:
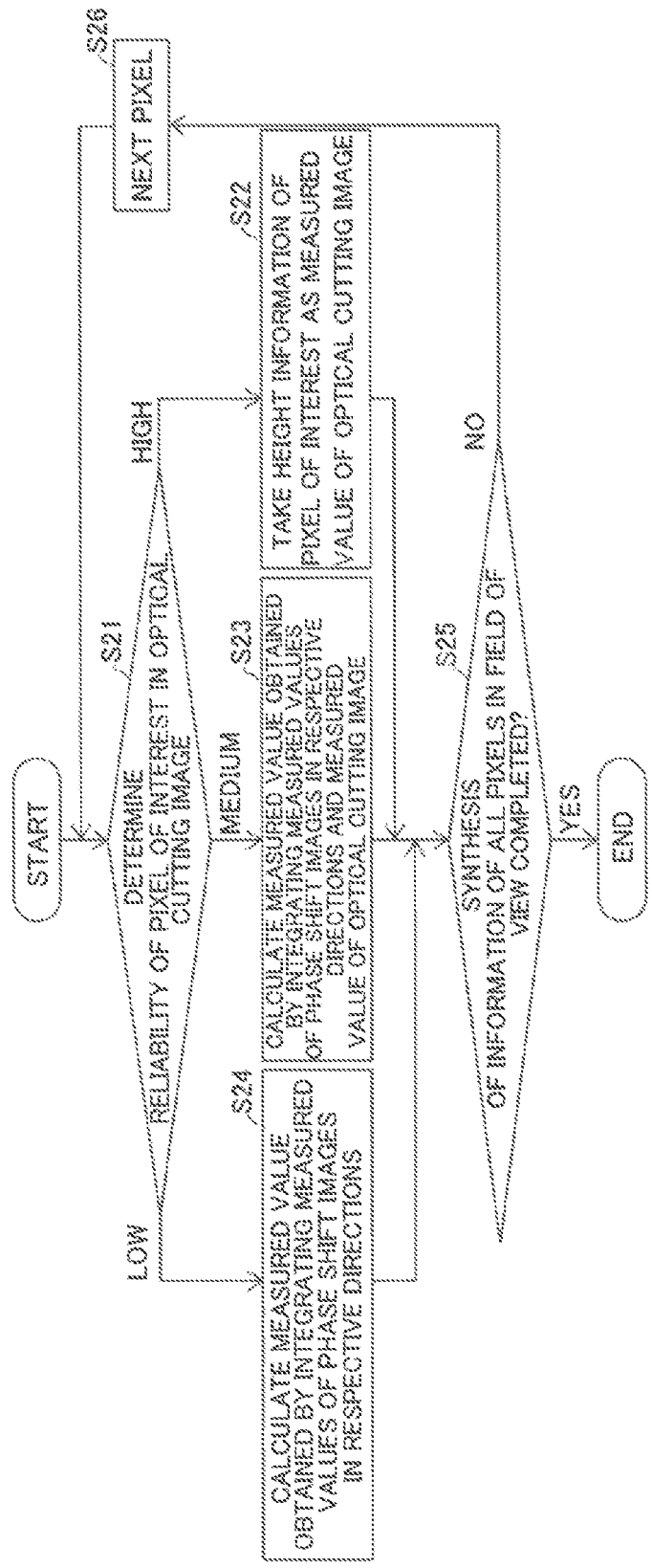
FIG. 18 is a flowchart for illustrating a second example of the per field of view height information synthesis process by the control device of the appearance inspection device according to the embodiment of the present disclosure.

In step S21 of FIG. 18, the reliability of the pixel of interest in the image by the optical cutting method is determined. When the reliability of the pixel of interest is high, the process advances to step S22. When the reliability of the pixel of interest is medium, the process advances to step S23. When the reliability of the pixel of interest is low, the process advances to step S24. In step S22, the height information on the pixel of interest is taken as the measured value of the image by the optical cutting method. Then, the process advances to step S25.

In step S23, a measured value obtained by synthesizing (integrating) the measured values of the images by the phase shift method in the respective directions and the measured value of the image by the optical cutting method is calculated. Then, the calculated measured value is taken as the height information on the pixel of interest. Then, the process advances to step S25. In step S24, a measured value obtained by synthesizing (integrating) the measured values of the images by the phase shift method in the respective directions is calculated. Then, the calculated measured value is taken as the height information on the pixel of interest. Then, the process advances to step S25.

In step S25, it is determined whether or not synthesis (integration) of information on all pixels in the field of view has been completed. When it has been completed, the per field of view height information synthesis process is terminated. When it has not been completed, the process advances to step S26. In step S26, the height information synthesis process switches to the next pixel. Then, the process returns to step S21.

(Description of Image Integration Process)

An image integration process by the control device 50 is now described with reference to FIG. 19. In this image integration process, the measured height information (measured values) is integrated (synthesized) at each position.

Figure 19:
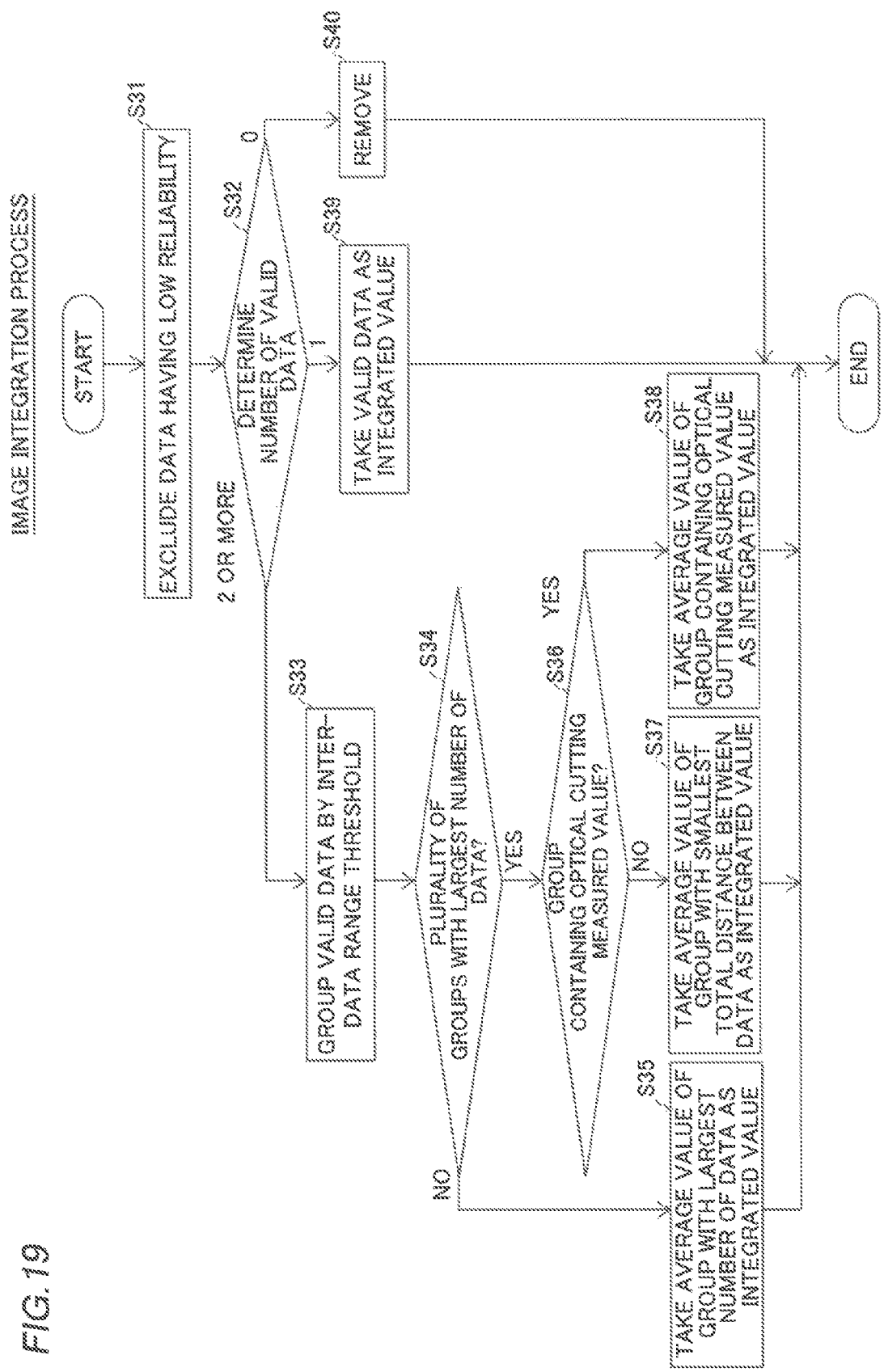
FIG. 19 is a flowchart for illustrating an image integration process by the control device of the appearance inspection device according to the embodiment of the present disclosure.

In step S31 of FIG. 19, height information data with low reliability is excluded from integration targets. In step S32, the number of valid data is determined. When the number of valid data is two or more, the process advances to step S33. When the number of valid data is one, the process advances to step S39. When the number of valid data is zero, the process advances to step S40.

In step S33, as shown in FIG. 12, the valid data is grouped by an inter-data range threshold. That is, the valid data within the inter-data range threshold is grouped as one group with certain valid data as a center. The largest number of groups generated is the number of valid data. In step S34, it is determined whether or not there are a plurality of groups with the largest number of data. When there are not a plurality of groups with the largest number of data (there is one group), the process advances to step S35, and when there are a plurality of groups with the largest number of data, the process advances to step S36.

In step S35, the average value of the measured values of a group with the largest number of data is taken as the integrated measured value. Then, the image integration process is terminated.

In step S36, it is determined whether or not there is a group containing the measured value by the optical cutting method. When there is no group containing the measured value by the optical cutting method, the process advances to step S37, and when there is a group containing the measured value by the optical cutting method, the process advances to step S38. In step S37, the average value of the measured values of a group with the smallest total distance between a plurality of pieces of data in the group is taken as the integrated measured value. Then, the image integration process is terminated.

In step S38, the average value of the measured values of the group containing the measured value by the optical cutting method is taken as the integrated measured value. Then, the image integration process is terminated.

In step S39, one piece of valid data that remains without being excluded is taken as the integrated measured value. Then, the image integration process is terminated.

In step S40, the height information on the pixel of interest is removed (no value). Then, the image integration process is terminated.

(Advantageous Effects of Embodiment)

According to this embodiment, the following advantageous effects are achieved.

According to this embodiment, as described above, the measurement target is measured by both the optical cutting method and the phase shift method, and thus the height information can be complemented by the measurement by the phase shift method even at a position at which light irradiation by the optical cutting method causes a shadow. Furthermore, the three-dimensional information can be acquired by a plurality of methods including the optical cutting method and the phase shift method, and thus the acquisition accuracy of the three-dimensional information can be improved. Consequently, the three-dimensional information on the measurement target can be accurately measured.

According to this embodiment, as described above, the first measurement unit 30 includes the first imager 31 having an optical axis arranged in the direction perpendicular to the reference plane, and the plurality of first projectors 32 configured to project the first measurement pattern imaged by the first imager 31 in the direction inclined with respect to the optical axis direction of the first imager 31. The second measurement unit 40 includes the second imager 41 having an optical axis arranged in the direction inclined with respect to the vertical direction of the reference plane and including the telecentric optical system 411, and the second projector 42 arranged at the position in the direction in which the optical axis of the second imager 41 is specularly reflected by the reference plane and configured to project the line-shaped second measurement pattern imaged by the second imager 41. Accordingly, even when the measurement target has a reflective surface such as a mirror surface or a glass surface, the second measurement pattern projected from the second projector 42 can be reliably imaged by the second imager 41 arranged at the position in the specular reflection direction. Furthermore, the second imager 41 includes the telecentric optical system 411, and thus the second measurement pattern reflected by the reflective surface of the measurement target can be imaged in parallel by the optical system without being deformed. Thus, the three-dimensional information can be accurately measured even for the measurement target having a reflective surface. Moreover, the plurality of first projectors 32 are provided in the first measurement unit 30 such that the first measurement pattern can be projected in a plurality of directions. Consequently, even when projection in one direction causes a shadow at a certain position, projection in another direction is performed such that a shadow can be significantly reduced or prevented. Thus, the three-dimensional information at a certain position can be reliably measured.

According to this embodiment, as described above, the control device 50 is configured or programmed to acquire one piece of height information based on the height information and the reliability information based on measurement of the first measurement unit 30, and the height information and the reliability information based on measurement of the second measurement unit 40. Accordingly, even when the height information based on the measurement of the first measurement unit 30 and the height information based on the measurement of the second measurement unit 40 are significantly different from each other, one piece of height information with higher reliability can be acquired based on each reliability information.

According to this embodiment, as described above, the control device 50 is configured or programmed to acquire one piece of height information based on the plurality of pieces of height information and the plurality of pieces of reliability information based on measurement of the first measurement unit 30, and the height information and the reliability information based on measurement of the second measurement unit 40. Accordingly, the plurality of pieces of height information is acquired by the first measurement unit 30 using the phase shift method, and thus one piece of height information with higher reliability can be acquired.

According to this embodiment, as described above, the control device 50 is configured or programmed to complement the height information with low reliability of the reliability information measured by the second measurement unit 40 with the height information measured by the first measurement unit 30. Accordingly, in measurement by the second measurement unit 40 using the optical cutting method, the height information can be complemented by measurement by the first measurement unit 30 using the phase shift method even when the reliability is lowered due to the influence of a shadow, for example.

According to this embodiment, as described above, the control device 50 is configured or programmed to exclude the measurement result in the direction in which a shadow is caused and to complement the height information when projection in the direction in which the first measurement pattern of the first measurement unit 30 is projected is presumed to cause a shadow due to the measurement target. Accordingly, the measurement result in the projection direction in which the accuracy is lowered due to the influence of a shadow among the plurality of projection directions of the first measurement pattern can be excluded, and thus the height information based on measurement of the second measurement unit 40 using the optical cutting method can be more accurately complemented with the plurality of pieces of height information measured by the first measurement unit 30 using the phase shift method.

According to this embodiment, as described above, the control device 50 is configured or programmed to acquire the reliability information at each position based on the luminance difference due to the plurality of measurements of the first measurement unit 30. Accordingly, the reliability information can be easily acquired based on the luminance difference due to the plurality of measurements by the first measurement unit 30 using the phase shift method.

According to this embodiment, as described above, the control device 50 is configured or programmed to acquire the reliability information at each position based on the luminance value based on measurement of the second measurement unit 40. Accordingly, the reliability information can be easily acquired based on the luminance value based on the measurement of the second measurement unit 40 using the optical cutting method.

According to this embodiment, as described above, the control device 50 is configured or programmed to determine whether the protrusion shape based on the measurement result of the first measurement unit 30 is noise or a structure based on the measurement result of the second measurement unit 40. Accordingly, it is possible to determine, by the optical cutting method of the second measurement unit 40, that a virtual image appearing in the protrusion shape by imaging by the phase shift method of the first measurement unit 30 is noise, and thus the noise is removed such that the height information can be more accurately acquired.

According to this embodiment, as described above, the control device 50 is configured or programmed to perform measurement by the second measurement unit 4 before measurement by the first measurement unit 30, and to perform a control to adjust the height position measured by the first measurement unit 30 based on the measurement result of the second measurement unit 40. Accordingly, based on the three-dimensional information measured by the second measurement unit 40 using the optical cutting method, the height position measured by the first measurement unit 30 using the phase shift method can be adjusted along the three-dimensional shape of the measurement target, and thus it is possible to easily focus the image.

According to this embodiment, as described above, the control device 50 is configured or programmed to perform measurement by the second measurement unit 4 before measurement by the first measurement unit 30, to acquire the plane position information on the measurement target based on the measurement result of the second measurement unit 40, and to perform a control to adjust the plane position measured by the first measurement unit 30. Accordingly, the operation of the first measurement unit 30 using the phase shift method to acquire the plane position information can be omitted, and thus an increase in the time required for the measurement operation can be significantly reduced or prevented as compared with a case in which the plane position information is acquired again by the first measurement unit 30.

(Modified Examples)

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

Figure 20:
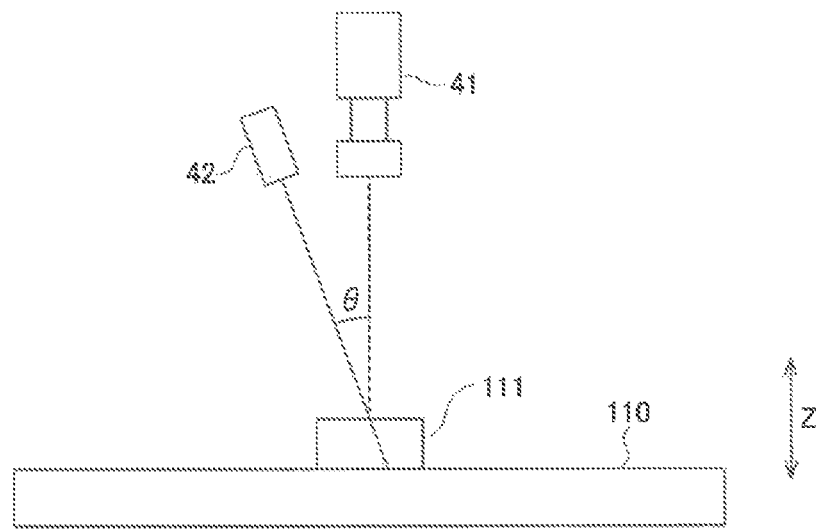
FIG. 20 is a diagram showing a second measurement unit of an appearance inspection device according to a first modified example of the embodiment of the present disclosure.

For example, while the example in which the second projector is arranged at the position in the direction in which the optical axis of the second imager is specularly reflected by the reference plane has been shown in the aforementioned embodiment, the present disclosure is not restricted to this. In the present disclosure, as in a first modified example of the embodiment shown in FIG. 20, a second imager 41 may be arranged so as to have an optical axis perpendicular to a reference plane, and the second projector 42 may be arranged in a direction inclined by a predetermined angle with respect to the optical axis of the second imager 41.

Figure 21:
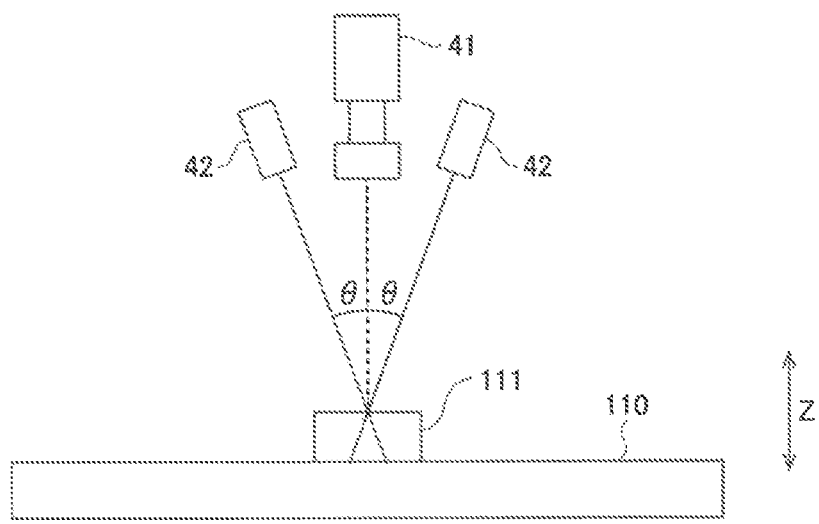
FIG. 21 is a diagram showing a second measurement unit of an appearance inspection device according to a second modified example of the embodiment of the present disclosure.

Furthermore, as in a second modified example of the embodiment shown in FIG. 21, a second imager 41 may be arranged so as to have an optical axis perpendicular to a reference plane, and a plurality of second projectors 42 may be arranged in directions inclined by a predetermined angle with respect to the optical axis of the second imager 41.

Figure 22:
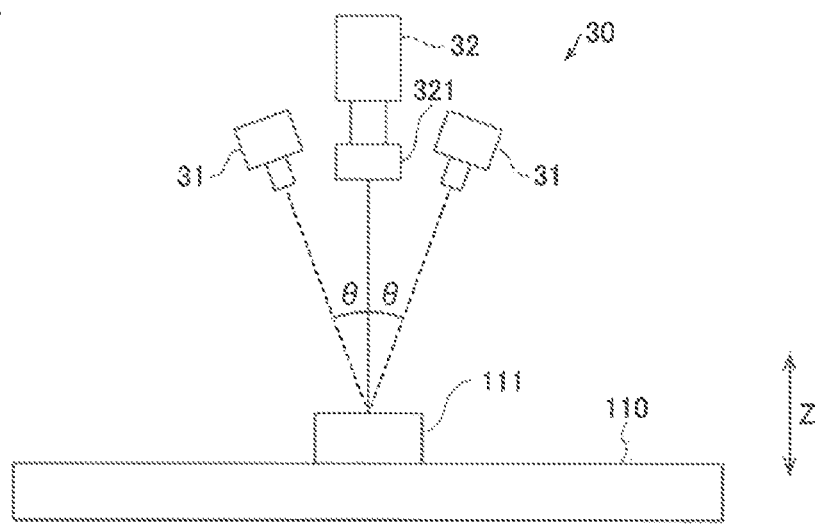
FIG. 22 is a diagram showing a first measurement unit of an appearance inspection device according to a third modified example of the embodiment of the present disclosure.

While the example in which the first measurement unit includes the first imager having an optical axis arranged in the direction perpendicular to the reference plane and the plurality of first projectors having optical axes arranged in the directions inclined with respect to the optical axis direction of the first imager has been shown in the aforementioned embodiment, the present disclosure is not restricted to this. In the present disclosure, as in a third modified example of the embodiment shown in FIG. 22, a first measurement unit 30 may include a first projector 32 having an optical axis arranged in a direction perpendicular to a reference plane, and a plurality of first imagers 31 having optical axes arranged in directions inclined with respect to the optical axis direction of the first projector 32. In this case, a telecentric optical system 321 may be provided in the first projector 32. Thus, a first measurement pattern is projected perpendicular to the reference plane. Consequently, secondary reflection can be significantly reduced or prevented, and thus the occurrence of secondary fringes can be significantly reduced or prevented. Furthermore, the plurality of first imagers 31 may be arranged so as to surround the first projector 32 as viewed from above. Moreover, the plurality of first imagers 31 may be arranged at positions equidistant from a projection center (first projectors 31) at substantially equiangular intervals. Thus, the plurality of first imagers 31 simultaneously perform imaging such that the imaging time can be shortened as compared with a case in which imaging is performed separately. That is, even when the imaging direction is increased, an increase in the imaging time can be significantly reduced or prevented.

While the example in which the three-dimensional measuring device according to the present disclosure is applied to the appearance inspection device that inspects the board has been shown in the aforementioned embodiment, the present disclosure is not restricted to this. The prevent disclosure is also applicable to another three-dimensional measurement of a foreign matter inspection device, a solder printing inspection device, a component inspection device, or the like. Alternatively, the present disclosure is also applicable to a device other than the device that inspects the board.

While the example in which the first measurement unit includes the four first projectors has been shown in the aforementioned embodiment, the present disclosure is not restricted to this. In the present disclosure, the first measurement unit may include one or a plurality of first projectors other than four.

While the example in which the second imager includes the telecentric optical system, and the second projector projects light telecentrically has been shown in the aforementioned embodiment, the present disclosure is not restricted to this. In the present disclosure, non-telecentrically spreading light may be projected from the second projector, or the second imager may not include the telecentric optical system.

While the example in which the reliability information of the second measurement unit is classified into three levels of high, medium, and low has been shown in the aforementioned embodiment, the present disclosure is not restricted to this. In the present disclosure, the reliability information of the second measurement unit may be classified into two levels or four or more levels. Alternatively, the reliability information of the second measurement unit may be numerical values without levels.

While the control process operations performed by the control device (controller) are described, using the flowcharts described in a manner driven by a flow in which processes are performed in order along a process flow for the convenience of illustration in the aforementioned embodiment, the present disclosure is not restricted to this. In the present disclosure, the process operations performed by the controller may be performed in an event-driven manner in which processes are performed on an event basis. In this case, the process operations may be performed in a complete event-driven manner or in a combination of an event-driven manner and a manner driven by a flow.

What is claimed is:

1. A three-dimensional measuring device comprising:
   a first measurement unit configured to measure three-dimensional information by a phase shift method, the first measurement unit including a first imager and a first projector configured to project a first measurement pattern imaged by the first imager;
   a second measurement unit configured to measure three-dimensional information by an optical cutting method, the second measurement unit including a second imager and a second projector configured to project a line-shaped second measurement pattern imaged by the second imager; and
   a controller configured or programmed to acquire three-dimensional information on a measurement target based on measurement results of both the first measurement unit and the second measurement unit.

2. A three-dimensional measuring device comprising:
   a first measurement unit configured to measure three-dimensional information by a phase shift method;
   a second measurement unit configured to measure three-dimensional information by an optical cutting method; and
   a controller configured or programmed to acquire three-dimensional information on a measurement target based on measurement results of both the first measurement unit and the second measurement unit,
   wherein
   the first measurement unit includes at least one first imager and at least one first projector configured to project a first measurement pattern imaged by the first imager;

one of the first imager and the first projector has an optical axis arranged in a direction perpendicular to a reference plane;

the other of the first imager and the first projector has an optical axis arranged in a direction inclined with respect to an optical axis direction of the one of the first imager and the first projector; and the second measurement unit includes a second imager having an optical axis arranged in a direction inclined with respect to a vertical direction of the reference plane, the second imager including a telecentric optical system, and a second projector arranged at a position in a direction in which the optical axis of the second imager is specularly reflected by the reference plane, the second projector being configured to project a line-shaped second measurement pattern imaged by the second imager.

3. A three-dimensional measuring device comprising:
a first measurement unit configured to measure three-dimensional information by a phase shift method;
a second measurement unit configured to measure three-dimensional information by an optical cutting method; and
a controller configured or programmed to acquire three-dimensional information on a measurement target based on measurement results of both the first measurement unit and the second measurement unit, wherein
the controller is configured or programmed to acquire height information indicating a height of the measurement target at each position and reliability information indicating reliability of the height information at the each position based on measurement of the first measurement unit, to acquire the height information and the reliability information based on measurement of the second measurement unit, and to acquire one piece of the height information based on the height information and the reliability information based on the measurement of the first measurement unit, and the height information and the reliability information based on the measurement of the second measurement unit.

4. The three-dimensional measuring device according to claim 3, wherein
the first measurement unit is configured to project a first measurement pattern in a plurality of directions to measure the three-dimensional information; and
the controller is configured or programmed to acquire a plurality of pieces of the height information and a plurality of pieces of the reliability information based on the measurement of the first measurement unit, and to acquire one piece of the height information based on the plurality of pieces of the height information and the plurality of pieces of the reliability information based on the measurement of the first measurement unit, and the height information and the reliability information based on the measurement of the second measurement unit.

5. The three-dimensional measuring device according to claim 4, wherein the controller is configured or programmed to complement the height information with low reliability of the reliability information measured by the second measurement unit with the height information measured by the first measurement unit.

6. The three-dimensional measuring device according to claim 5, wherein the controller is configured or programmed to exclude the measurement result in a direction in which a shadow is caused and to complement the height information when projection in a direction in which the first measurement pattern of the first measurement unit is projected is presumed to cause the shadow due to the measurement target.

7. The three-dimensional measuring device according to claim 3, wherein the controller is configured or programmed to acquire the reliability information at the each position based on a luminance difference due to a plurality of measurements of the first measurement unit.

8. The three-dimensional measuring device according to claim 3, wherein the controller is configured or programmed to acquire the reliability information at the each position based on a luminance value based on the measurement of the second measurement unit.

9. A three-dimensional measuring device comprising:
a first measurement unit configured to measure three-dimensional information by a phase shift method;
a second measurement unit configured to measure three-dimensional information by an optical cutting method; and
a controller configured or programmed to acquire three-dimensional information on a measurement target based on measurement results of both the first measurement unit and the second measurement unit,
wherein the controller is configured or programmed to determine whether a protrusion shape based on the measurement result of the first measurement unit is noise or a structure based on the measurement result of the second measurement unit.

10. A three-dimensional measuring device comprising:
a first measurement unit configured to measure three-dimensional information by a phase shift method;
a second measurement unit configured to measure three-dimensional information by an optical cutting method; and
a controller configured or programmed to acquire three-dimensional information on a measurement target based on measurement results of both the first measurement unit and the second measurement unit,
wherein the controller is configured or programmed to perform measurement by the second measurement unit before measurement by the first measurement unit, and to perform a control to adjust a height position measured by the first measurement unit based on the measurement result of the second measurement unit.

11. A three-dimensional measuring device comprising:
a first measurement unit configured to measure three-dimensional information by a phase shift method;
a second measurement unit configured to measure three-dimensional information by an optical cutting method; and
a controller configured or programmed to acquire three-dimensional information on a measurement target based on measurement results of both the first measurement unit and the second measurement unit,
wherein the controller is configured or programmed to perform measurement by the second measurement unit before measurement by the first measurement unit, to acquire plane position information on the measurement target based on the measurement result of the second measurement unit, and to perform a control to adjust a plane position measured by the first measurement unit.

12. The three-dimensional measuring device according to claim 1, wherein the measurement target includes a board on which an electronic component is mounted.

13. The three-dimensional measuring device according to claim 2, wherein
the controller is configured or programmed to acquire height information indicating a height of the measurement target at each position and reliability information indicating reliability of the height information at the each position based on measurement of the first measurement unit, to acquire the height information and the reliability information based on measurement of the second measurement unit, and to acquire one piece of the height information based on the height information and the reliability information based on the measurement of the first measurement unit, and the height information and the reliability information based on the measurement of the second measurement unit.

14. The three-dimensional measuring device according to claim 4, wherein the controller is configured or programmed to acquire the reliability information at the each position based on a luminance difference due to a plurality of measurements of the first measurement unit.

15. The three-dimensional measuring device according to claim 5, wherein the controller is configured or programmed to acquire the reliability information at the each position based on a luminance difference due to a plurality of measurements of the first measurement unit.

16. The three-dimensional measuring device according to claim 4, wherein the controller is configured or programmed to acquire the reliability information at the each position based on a luminance value based on the measurement of the second measurement unit.

17. The three-dimensional measuring device according to claim 2, wherein the controller is configured or programmed to determine whether a protrusion shape based on the measurement result of the first measurement unit is noise or a structure based on the measurement result of the second measurement unit.

18. The three-dimensional measuring device according to claim 2, wherein the controller is configured or programmed to perform measurement by the second measurement unit before measurement by the first measurement unit, and to perform a control to adjust a height position measured by the first measurement unit based on the measurement result of the second measurement unit.

19. The three-dimensional measuring device according to claim 2, wherein the controller is configured or programmed to perform measurement by the second measurement unit before measurement by the first measurement unit, to acquire plane position information on the measurement target based on the measurement result of the second measurement unit, and to perform a control to adjust a plane position measured by the first measurement unit.

20. The three-dimensional measuring device according to claim 2, wherein the measurement target includes a board on which an electronic component is mounted.

* * * * *